United States Patent [19]
Salanitro

[11] Patent Number: 5,811,010
[45] Date of Patent: Sep. 22, 1998

[54] MICROBIAL DEGRADATION OF TERTIARY BUTYL ALCOHOL

[75] Inventor: Joseph Patrick Salanitro, Houston, Tex.

[73] Assignee: Shell Oil Company, Houston, Tex.

[21] Appl. No.: 465,997

[22] Filed: Jun. 6, 1995

[51] Int. Cl.[6] .................................................. C02F 1/78
[52] U.S. Cl. ............................................ 210/610; 210/908
[58] Field of Search ......................... 210/610, 611, 210/631, 908

[56] References Cited

U.S. PATENT DOCUMENTS

| | | | |
|---|---|---|---|
| 3,660,278 | 5/1972 | Mimura et al. | 210/611 |
| 4,855,051 | 8/1989 | Insell | 210/611 |
| 5,413,717 | 5/1995 | Webster, Jr. et al. | 210/631 |

*Primary Examiner*—Thomas G. Wyse
*Attorney, Agent, or Firm*—Y. Grace Tsang

[57] ABSTRACT

A process for the aerobic degradation of t-butyl alcohol using a mixed bacterial culture prepared from an enrichment process using an ether containing a t-butyl moiety and an activated sludge retrieved from a biotreater for treating wastewater from a chemical plant.

3 Claims, 1 Drawing Sheet

MICROBIAL DEGRADATION OF TERTIARY BUTYL ALCOHOL

FIELD OF THE INVENTION

This invention relates to a process for degrading tertiary butyl alcohol (TBA) using a novel bacterial culture developed from microorganisms present in a chemical plant biotreater sludge. This invention further relates to a bacterial culture capable of degrading tertiary butyl alcohol (TBA), and the process for preparing such culture.

BACKGROUND OF THE INVENTION

Tertiary butyl alcohol, hereafter referred to as TBA, is a four carbon aliphatic alcohol that due to its intrinsic quaternary or tertiary structure is extremely resistant to biodegradation. It is being used as an octane-enhancer in the reformulation of unleaded gasoline blends. It is known that when TBA-containing fuels are accidentally released to the subsurface, TBA persists in groundwater, wastewater, and/or soil.

U.S. Pat. No. 4,855,051 issued to Polysar Limited discloses bacterial strains isolated from soil, silt, water and activated sludge capable of catabolizing TBA. However the length of time required to degrade TBA by these bacterial strands is relatively long.

Thus, there is a need for an effective tertiary butyl alcohol (TBA) degradable bacterial culture useful for treating wastes and groundwater containing TBA.

SUMMARY OF THE INVENTION

This invention relates to (a) a process for the aerobic degradation of t-butyl alcohol using a mixed bacterial culture prepared from an enrichment process using an ether containing a t-butyl moiety, such as methyl t-butyl ether (MTBE), and an activated sludge retrieved from a biotreater for treating wastewater from a chemical plant; (b) a process for preparing a bacterial culture which is capable of degrading t-butyl alcohol to $CO_2$ using an ether containing a t-butyl moiety, such as MTBE, and an activated sludge retrieved from a biotreater for treating wastewater from a chemical plant; and (c) a bacterial culture capable of degrading t-butyl alcohol to carbon dioxide under aerobic conditions.

DETAILED DESCRIPTION OF THE INVENTION

Figure 1:
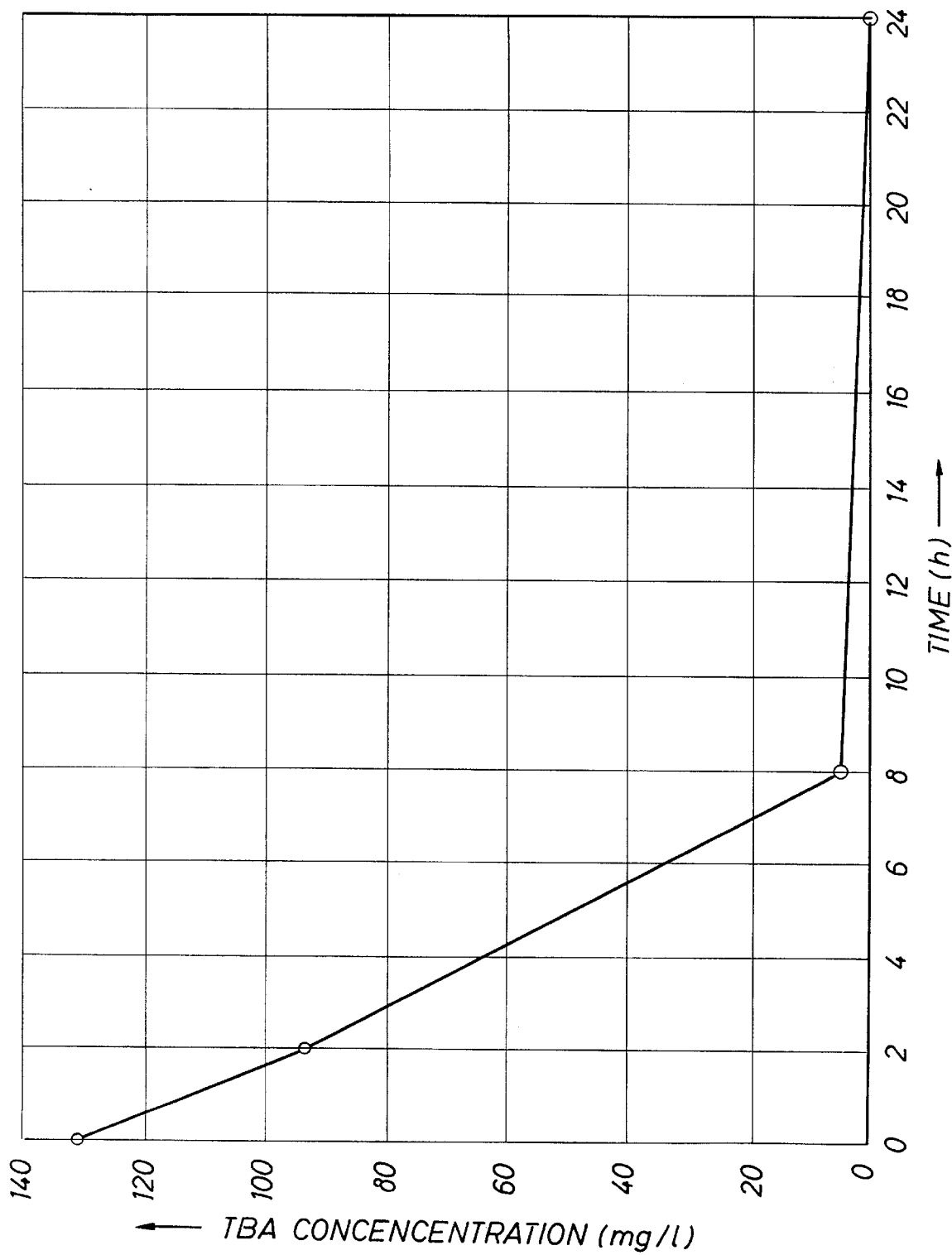

The present invention relates to a novel mixed bacterial culture capable of degrading t-butyl alcohol (TBA). The novel mixed bacterial culture can also metabolize ethers, including aromatic ethers, linear alkyl ethers, and branched alkyl ethers. Non-limiting and illustrative examples of the linear and branched alkyl ethers include methyl t-butyl ether (MTBE), diethyl ether (DEE), dimethyl ether (DME), methyl ethyl ether (MEE), methyl n-propyl ether (MPE), ethyl n-propyl ether, methyl isopropyl ether, ethyl isopropyl ether, diisopropyl ether (DIPE), ethyl t-butyl ether (ETBE) or methyl-t-amyl ether.

Specifically, the invention relates to a novel mixed bacterial culture, which is capable of degrading TBA. The novel mixed bacterial culture is also capable of degrading ether(s) containing a t-butyl moiety, such as MTBE, with the transient formation of t-butyl alcohol (TBA) to carbon dioxide. The culture is enriched by incubating an ether containing a t-butyl moiety, such as MTBE, with an activated sludge, thereby generating a culture which is capable of degrading the ether containing a t-butyl moiety and which is also effective in degrading TBA. In a specific embodiment of the present invention, the culture is capable of degrading TBA to carbon dioxide.

As a more specific embodiment of the present invention, the novel mixed bacterial culture includes any composition derived from the mixed bacterial culture enriched from incubating an ether containing a t-butyl moiety, such as MTBE, and an activated sludge retrieved from a biotreater for treating wastewater. Illustrative examples of the compositions derived from the mixed bacterial culture include, but not limited to, fragments of bacterial culture, membrane fragments of bacterial culture, enzymes extracted and/or isolated from the bacterial culture, lyophilized and/or dried culture, lyophilized and/or dried fragments of culture, lyophilized and or dried enzymes derived from said culture, bacterial culture and/or fragments thereof and/or enzymes derived therefrom bound to a carrier and/or binder and/or fixed bed, etc. Any method known to one skilled in art for making composition derived from the mixed culture including but not limited to extraction or fragmentation to obtain active ingredients/fragments thereof is within the scope of the present invention. As a non-limiting example of the present invention, the mixed culture can be first fragmented by sanification or lysing with lysozyme and/or a compound such as a chelating compound, followed by salting out the enzyme fractions using ammonium sulfate or NaCl.

The present invention also relates to a process for preparing the above-mentioned novel mixed bacterial culture by adding an ether containing a t-butyl moiety such as MTBE to an activated sludge obtained from a biotreater located in a wastewater treatment plant. As a specific embodiment of the present invention, the activated sludge retrieved from a biotreater located in a wastewater treatment plant of a chemical plant. As a more specific embodiment of the present invention, the activated sludge is retrieved from the biotreater of the South Effluent Treater for treating wastewater from the Chemical Plant of Shell Deer Park Manufacturing Complex located at 5900 Highway 225, Deer Park Tex. 77536.

The culture is prepared by adding an ether containing a t-butyl moiety to the biosludge (activated sludge) and incubating for a period time. As one specific embodiment of the present invention, the biosludge is first added to a mineral nutrient solution. One specific, but non-limiting, example of the mineral solution is Sturm solution comprising $KH_2PO_4$, $K_2HPO_4$, $Na_2HPO_4 \cdot 2H_2O$, $MgSO_4 \cdot 7H_2O$, $NH_4Cl$, $(NH_4)_2SO_4$, and $FeCl_3 \cdot 6H_2O$. Incubation using other nutrient solution known to those skilled in the art is within the scope of the present invention. The concentration of the biosludge in the incubated medium (culture) can be any suitable amount which would produce sufficient concentration of ether degrading bacteria. In a specific embodiment of the present invention, from about 50 mg to about 5000 mg, more specifically from about 50 mg to about 1500 mg, still more specifically from about 300 to about 800 mg, of the biosludge solids are added to every liter of the incubation medium.

The above culture is enriched by adding a suitable amount of an ether containing a t-butyl moiety. In a specific embodiment of the present invention, about 5–5000 mg, specifically from about 10–500 mg, more specifically about 30–50 mg, of the ether containing a t-butyl moiety is added to every liter of the culture (incubation medium or mixture).

The mixture or culture is incubated for a period of time. The temperature at which the culture is incubated typically ranges from about 5° C. to about 80° C., specifically from 10° C. to about 60° C., more specifically from about 15° C. to about 35° C., still more specifically from about 22° C. to about 25° C. Periodically, a sample of the culture (or supernatant) is withdrawn for ether and/or TBA analysis. Surprisingly, it has been found that a culture enriched by this process would also effectively degrade TBA if there is detectable reduction of the concentration of the ether containing t-butyl moiety in the culture being enriched, after taking into account of the amount of branched alkyl ether evaporated. As an illustrative but non-limiting example, a culture which is considered very active in degrading the ether will degrade a solution containing about 0.001–5000 ppm, more specifically about 0.01–500 ppm, still more specifically about 0.05–100 ppm, of the ether containing a t-butyl moiety by about 10% to 100%, specifically 30–100%, more specifically from about 50% to 100%, still more specially from about 80% to about 100% in about 2–70 hours, specifically about 2–12 hours, more specifically about 3–5 hours. A culture made by the present invention which is found to be active in degrading ether containing t-butyl moiety is found to degrade TBA effectively, i.e. will degrade a solution containing about 0.001–5000 ppm, more specifically about 0.01–500, still more specifically about 0.05–100 ppm, of the ether by about 10% to about 100%, specifically about 30–100%, more specifically from about 50% to about 100%, still more specifically from about 80% to about 100% in about 2–70 hours, specifically about 2–12 hours, more specifically about 3–5 hours. As one non-limiting illustrative example, the culture is capable of degrading a solution containing about 130 mg/L of t-butyl alcohol to less than 5 mg/L in about 8 hours.

In one specific embodiment of the present invention, the mixture of the activated sludge of the mineral solution is first flushed with oxygen before the addition of the ether.

In still another specific embodiment of the present invention, periodically, a portion in an amount of about 5–80%, specifically about 10–70%, more specifically about 40–60%, of the supernatant of the culture is withdrawn and fresh mineral or nutrient solution is added to at least partially replacing the amount of supernatant withdrawn. The withdrawal can be conducted at an interval of about 1–30 days, specifically 2–10 day, more specifically about 5–8 days.

As another specific embodiment of the present invention, multiple additions to the culture of the ether containing the t-butyl moiety is made to the culture (incubating medium). As a specific aspect of this embodiment, sufficient amount of the ether is added either immediately after each withdrawal of the supernatant or simultaneously with the addition of the replacement portion of mineral or nutrient solution, thereby compensating the loss of the ether resulted from the withdrawal. As another specific aspect of this embodiment, sufficient amount of ether is added each time designed to maintain the MTBE concentration at about 50–150%, specifically about 80–120%, of the original concentration.

As a preferred embodiment of the present invention, multiple additions (re-inoculation) of the activated sludge is made to the culture periodically, such as at an interval of about 2–60 days, specifically about 3–30 days, more specifically about 5–10 days. In a specific aspect of this embodiment, from about 50 mg to about 5000 mg, more specifically from about 50 mg to about 1500 mg, still more specifically from about 300 to about 800 mg, of biosludge solids are added to every liter of the incubation medium at each re-inoculation.

As a preferred embodiment of the present invention, methyl t-butyl ether (MTBE) is used in the enrichment of the bacterial culture to produce a TBA and MTBE degradable culture.

The enrichment process typically lasts from about 1 months to about one year, more typically from about 1.5 months to 5 months, more typically from about 2 months to about 4 months.

As a more preferred embodiment of the present invention, the culture produced is also capable of degrading alkyl ethers, specifically branched alkyl ethers, more specifically MTBE, to carbon dioxide. The culture prepared can also be used to degrade isopropyl alcohol and acetone.

The present invention further involves a process for degrading t-butyl alcohol (TBA) by contacting or growing the aforementioned culture or composition derived from the culture with or in a solution containing TBA to be degraded. As a specific embodiment of the present invention, the TBA to be degraded can be an ingredient in an aqueous solution such as groundwater and wastewater, a solid mixture such as soil, etc.

A specific embodiment of the present invention involves degrading both TBA and an ether containing a t-butyl moiety such as MTBE.

The degradation can be conducted at a temperature from about 5° C. to about 80° C., specifically from about 10° C. to about 60° C., more specifically from about 15° C. to about 35° C., still more specifically at ambient temperature. The degradation is preferably conducted under oxygen-containing atmosphere, such as aerobic conditions.

As a specific embodiment of the present process, the bacterial culture is used to remediate groundwater and/or wastewater and/or soil containing TBA. A further advantage of the present process includes the capability of remediating groundwater and/or wastewater and/or soil containing both TBA and an ether containing t-butyl moiety such as MTBA.

As an illustrative non-limiting example, the process degrades at least a portion of the TBA to carbon dioxide. As another illustrative non-limiting example, the process degrades TBA and/or ether containing t-butyl moiety completely mineralize to carbon dioxide and thus providing a remediation process which is substantially free of environmentally undesirable end products.

The present process is capable of degrading/remediating TBA in an aqueous mixture containing from about 0.001 ppm to about 5000 ppm, specifically from about 0.01 ppm to about 500 ppm, more specifically from about 0.05 ppm to about 100 ppm of the TBA; to reduce the content thereof by about 10% to about 100%, specifically from about 30% to about 100%, more specifically from about 50% to about 100%, still more specifically from about 80% to about 100% in from about 2 hours to about 70 hours, specifically from about 2 hours to about 12 hours, more specifically from about 3 hours to about 5 hours, by growing in the aqueous mixture the culture of the present invention.

The isolated bacterial enrichment (BC-1) could also cleave the ether linkage of the ether containing t-butyl moiety such as MTBE with the transient formation of t-butylalcohol (TBA). BC-1 can also metabolize other linear and branched ethers including diethyl ether (DEE), dimethyl ether (DME), methyl ethyl ether (MEE), methyl n-propyl ether (MPE), ethyl n-propyl ether, methyl isopropyl ether, ethyl isopropyl ether, diisopropyl ether (DIPE), ethyl t-butyl ether (ETBE) or methyl-t-amyl ether (MTAE), etc.

The invention will be illustrated by the following illustrative embodiments which are provided for illustration purpose only and are not intended to limit the scope of the instant invention.

ILLUSTRATIVE EMBODIMENTS

The following illustrative embodiments describe typical techniques of the present invention.

PART A: DERIVATION OF TBA DEGRADABLE CULTURE

A-I: BC-1 TBA DEGRADABLE CULTURE DERIVED FROM ACTIVATED SLUDGE FROM CHEMICAL PLANT BIOTREATER

The biosludge (activated sludge) used in this run (A-I) was retrieved from the biotreater of the South Effluent Treater for treating wastewater from the Chemical Plant of Shell Deer Park Manufacturing Complex located at 5900 Highway 225, Deer Park Tex. 77536. About 100–200 ml of the biosludge (activated sludge) containing about 300 to 800 mg of biosludge solids were added to 1 liter of Sturm solution containing the following minerals (in milligrams per liter, i.e. ppm) to form a culture in a 2-liter stirred glass vessel sealed with Viton O rings: $KH_2PO_4$, 17; $K_2HPO_4$, 44; $Na_2HPO_4 \cdot 2H_2O$, 67; $MgSO_4 \cdot 7H_2O$, 23; $NH_4Cl$, 3.4; $(NH_4)_2SO_4$, 40; $FeCl_3 \cdot 6H_2O$, 1. Information on this mineral solution can be found in Sturm, R. N., Biodegradability of nonionic surfactants: screening test for predicting rate and ultimate degradation. J. Am. Oil Chem. Soc. 50: 159–167 (1973).

The above culture was enriched by first flushing with oxygen for 5 minutes, followed by adding MTBE at an amount of about 30–50 mg MTBE per liter of the culture.

The culture was stirred continuously at room temperature (22°–25° C.). At weekly intervals, 1–3 ml of the slurries were withdrawn and allowed to settle (or be filtered). The supernatant and samples (1–3 ml supernatant) withdrawn for MTBE analysis. At each sampling, the culture was enriched by removing 500 ml of supernatant medium and replacing with 500 ml of the sterile minerals solution containing 30–50 ppm MTBE. No significant reduction of MTBE concentration in the supernatants sampled was detected for about two months.

Starting two months after the commencement of the enrichment procedure, re-inoculation involving multiple additions of about 100–200 ml of the above-described activated-sludge retrieved from Shell Deer Park Chemical Plant biotreater was made to the culture about every 7–30 days for about two months. The above-mentioned enrichment procedure of periodic additions of MTBE and withdrawal of the supernatant was also continued.

After two months, this enriched culture became active in consistently degrading MTBE concentrations in the supernatant about 50% to about 100% in about 2–4 hours. This culture was subsequently designated BC-1.

A-II: CONTROL- 1% NaCN

A vessel used as a control was prepared following the enrichment procedure described in A-I above using the same biosludge material, except sufficient NaCN was added so that the culture contains 1% NaCN. NaCN was used as a microbial respiration inhibitor to monitor any ether loss from volatilization.

RESULTS

The Control (A-II) showed less than 10% loss of ether from volatilization. Mixed culture made from A-I, consistently degraded both TBA and MTBE.

MICROSCOPIC AND SPECIES CHARACTERISTICS OF BC-1 CULTURE

Microscopic examination of phase-contrast and gram-stained smears of BC-1 showed that it contains gram-positive filamentous species and several gram-negative smaller rod-shaped bacteria. Preliminary identification of colonies isolated on a minerals (Sturm solution) agar medium containing 200 ppm of MTBE indicate that BC-1 contains at least 4–5 organisms including species of coryneforms, Pseudomonas and Achromobacter. All of these isolates utilize acetate, but none have been shown to grow on MTBE as sole source of carbon.

PART B: MAINTENANCE AND ANALYSIS OF BC-1 IN A BENCH BIOTREATER

The BC-1 culture obtained from A-I above was placed into a four-liter capacity sealed glass vessel for continuous culture maintenance. A similar suspended solids recycle apparatus with aerator (4L) and clarifier (1L) has been described in Salanitro et al, *Effects of Ammonia and Phosphate Limitation on the Activated Sludge Treatment of Calcium-Containing Waste*, Biotechnol. Bioeng. 25 513–523 (1983), with the exception that pure oxygen was used in place of air to provide aerobic conditions. Dissolved oxygen was monitored with a Leeds and Northrup 7932 meter and probe and maintained at 4–7 mg/liter (ppm) with an oxygen flow rate of 10 ml/min. MTBE (2% solution) was added continuously at a rate of 30–40 ml/day (150–200 mg/liter (ppm)) using a Watson-Marlow (Model 101U) peristaltic pump. The pH was kept at 7.2–7.5 by the infusion of 2M NaOH solution from a Masterflex® peristaltic pump. The culture was also fed with a minerals solution (4 liters/day) consisting of NaCl (1,000 ppm), $NH_4CL$ (380 ppm), $KH_2PO_4$ (350 mg/liter (ppm)), and $MgSO_4 \cdot 7H_2O$ (30 ppm). The TBA and ether-degrading culture developed a stable nitrifying population under high $NH_4^+$ (380 mg/liter (ppm) $NH_4Cl$) or low $NH_4^+$ (65 mg/liter (ppm) $NH_4Cl$) conditions. Suspended solids removed from the unit included 35–40 ml/day from the aerator (intentionally wasted) and 8 to 48 mg/day from the effluent. This waste rate was equivalent to a 80–90 day cell residence time.

Influent and effluent samples from the continuous biotreater were analyzed for cell dry weight according to methods outlined in Standard Methods for the examination of water and wastewater, 17th ed. Method 5210-B, American Public Health Association, Washington, D.C. $NH_4^+$, $NO_3^-$ and $PO_4^{-3}$ ions were estimated by routine Dionex® ion chromatography.

Data on the growth and metabolism of the BC-1 culture in the solids recycle culture are given in TABLE 1 below.

TABLE 1

| Nitrification and Biomass Yields in BC-1 Continuous Culture Degrading MTBE | | |
|---|---|---|
| | Nitrifying Condition | |
| Parameter[a] | High $NH_4^+$ | Low $NH_4^+$ |
| Influent $NH_4^+$, ppm | 120–125 | 10–20 |
| Effluent $NO_3^-$, ppm | 390–450 | 50–70 |
| Reactor TSS, ppm[b] | 2500–2580 | 2020–2340 |
| Solids retention, days | 80–90 | 80–85 |
| Average % MTBE removed | 80–90[c] | 60–65[d] |
| Cell yield, g TSS/g MTBE utilized | 0.21–.24 | 0.23–.28 |

[a]Analyses given are the average of four weeks data under each condition.
[b]Waste rates were 1.1–1.31 every four weeks; effluent TSS under both conditions varied from 2–12 ppm and contributed 25–30% of biomass loss from the unit.
[c]Influent and effluent MTBE varied from 160–210 ppm and 3–40 ppm, respectively.
[d]Influent and effluent MTBE varied from 120–175 ppm and 50–60 ppm, respectively.

PART C: BATCH T-BUTYL ALCOHOL (TBA) SUBSTRATE REMOVAL EXPERIMENTS

The utilization of t-butyl alcohol (TBA), was assessed in batch removal assays with BC-1. In this test, 130 ppm of TBA were added to one liter of BC-1 culture in a 1.5 liter vessel. Before addition of TBA, the culture was flushed with sterile 100% $O_2$ in a 1.5 liter sealed vessel for 2–5 minutes to achieve a dissolved oxygen level of 20 ppm. The reaction vessel was stirred continuously at 22°–25° C. and the depletion of substrates monitored by sampling (2–3 ml) over a 24 hours period. The concentration of TBA was analyzed by methods described below.

ANALYSIS OF TBA

Culture samples were analyzed for t-butanol using a Hewlett-Packard Model 280 gas chromatography-flame ionization detection system. Compounds were separated on a Quadrex methyl silicone (1-μm-thick film) capillary column having dimensions 25 m long and 0.025 mm inside diameter. (Alltech/Applied Science Labs, State College, Pa.). The column was set initially at 30° C. for 3 minutes and then programmed to 70° C. at 20° C./min. The carrier gas consisted of helium (30 ml/min) and a $N_2$ make-up gas. One microliter split samples were analyzed. Retention time of TBA was 3.8 minutes.

RESULTS OF SUBSTRATE REMOVAL EXPERIMENTS

Results of batch substrate depletion assays with BC-1 in the presence of TBA are shown in FIG. 1. TBA (120 mg/liter) was rapidly degraded, within 4 hours at a rate of 14 mg/g of cells per hour.

PART D: OXYGEN UPDATE EXPERIMENTS

Oxygen uptake rates (OUR) were performed on the BC-1 culture in the presence of substrates and potential metabolic intermediates of MTBE. A Yellow Springs Instrument Company oxygen electrode-water bath assembly (Model 53; 5 ml reaction compartment) was used for these experiments. Suspended solids (TSS) from BC-1 were centrifuged (23, 900 x g, 10 min at 4° C.), resuspended to one-half the volume in a sterile phosphate-buffered saline solution, PBS (0.85% NaCl, 0.03M $Na_2HPO_4$ and 0.05M $KH_2PO_4$, PH7.2). The 2X concentrated culture was aerated (sterile house air) continuously at 30° C. and maintained at a dissolved oxygen level of 6–7 ppm before using in OUR experiments. About 0.01–0.03 g TSS were used in each reaction. Substrates were added at levels of 15 or 50 ppm from sterile stock (1,000 ppm) solutions and oxygen depletion monitored over 3–5 minutes at 30° C. The oxygen electrode and the dissolved oxygen concentration was interfaced and calibrated to the deflection of a 1 mV recorder (Houston Instrument Company) and rates calculated from the slopes of the tracings. OUR are given as mg oxygen utilized/g TSS/h.

The ability of BC-1 to oxidize TBA, MTBE and potential downstream degradation products and other cellular intermediates was determined by oxygen uptake rate (OUR) methods and these data are shown in Table 2. Highest OUR was observed with $NH_4^+$, however, allylthiourea, a specific inhibitor of $NH_4^+$ oxidation, completely blocked this oxygen utilization. MTBE showed two distinct OUR, an initial faster (5.2–5.9 mg $O_2$/g/hr) and a slower (50% less) rate. Addition of allylthiourea had no effect on oxygen utilization in the presence of MTBE. t-Butylformate (TBF, t-butyl-O-C(O)H ), an intermediate in the reaction of atmospheric-derived chloride and hydroxy free radicals with MTBE also enhanced oxygen uptake in BC-1. t-Butanol, isopropanol and lactate showed comparable OUR to MTBE (4.3–7 mg/g/h).

TABLE 2

Oxygen Uptake Rates (OUR) with Culture BC-1[a]

| Substrate[b] | Net OUR mgO$_2$/g TSS/h |
|---|---|
| 1. NH$_4^+$ | 17.4 |
| 2. NH$_4^+$ + allylthiourea | —[c] |
| 3. Allylthiourea | —[c] |
| 4. MTBE | 5.2–5.9, 2.3[d] |
| 5. MTBE + allythiourea | 5.2 |

TABLE 2-continued

Oxygen Uptake Rates (OUR) with Culture BC-1[a]

| Substrate[b] | Net OUR mgO$_2$/g TSS/h |
|---|---|
| 6. t-Butylformate (Na) | 7.2 |
| 7. t-Butanol | 6.0 |
| 8. Isopropanol | 4.3 |
| 9. Lactate (Na) | 7.0 |

[a]Continuous culture treating high NH$_4^+$ (120 ppm) and MTBE (150–200 ppm) levels.
[b]All compounds added at 50 ppm.
[c]Less than or equal to the endogenous OUR.
[d]First and second OUR.

PART E: RADIOLABELED MTBE EXPERIMENTS

The $^{14}CH_3O$-MTBE was custom synthesized by Amersham Corp., (Arlington Heights, Ill.). It had a specific activity of 1.19 μ Ci/mg and was 99.3% pure by radiochromatography. Cultures were centrifuged, washed and resuspended in the same volume of sterile PBS buffer (PBS, 0.85% NaCl, 0.03M $Na_2HPO_4$, 0.05M $KH_2PO_4$, pH 7.2), and placed in 125 ml serum bottles sealed with Teflone lined septa. $^{14}CH_3O$-MTBE was added to a concentration of 0.08 μ Ci/ml and MTBE at 2 ppm. Cultures were incubated at 300 on a rotary shaker (150–200 rpm) for seven days. The amount of $^{14}CO_2$ formed was determined by placing a 10-ml aliquot of the culture in a similar serum bottle, adjusting the pH to ≦2 with 6N HCl and then flushing the bottle for one hour with a steady stream of $N_2$ into three gas washing bottles containing 0.1M Ba (OH)$_2$. The Ba$^{14}CO_3$ precipitate (formed after co-precipitation with $Na_2CO_3$ addition) was collected onto 0.45 μm Millipore filters, washed with PBS, dried and the radioactivity was counted. After removal of $^{14}CO_2$, the culture was filtered onto a 0.22 μm Millipore filter, washed with PBS, dried and counted to estimate $^{14}C$ activity incorporated into biomass (cells). The remaining radioactivity in the filtrate represents undegraded $^{14}CH_3O$-MTBE and/or $^{14}C$-metabolites. The efficiency of trapping $^{14}CO_2$ by this method was confirmed in separate experiments in which NaH$^{14}CO_3$ was added (0.06 μCi, 70 ppm as $CO_2$) to PBS or azide-inhibited cultures, acidified (pH≦2) and flushed into Ba(OH)$_2$ traps as described. The recovery of H$^{14}CO_3^-$ as Ba$^{14}CO_3$ was 95–100% of the applied radioactivity. The $^{14}C$-radioactivity was determined by placing 1-ml amounts of culture fluid (total $^{14}C$) filtrates or filters containing Ba$^{14}CO_3$ precipitates into glass scintillation vials containing 15 ml Aquasol-2 Universal 2SC Cocktail (NEN Dupont Research Products, Boston, Mass.). Vials were counted in a Packard TRI-CARB (Model 2500 TR) liquid scintillation analyzer (Packard Instrument Co., Meriden, Conn.).

Results of the biodegradation of radiolabeled ether (2 ppm) by BC-1 are given in Table 3. Less than 1% and 5% of the applied isotope was recovered as $^{14}CO_2$ and $^{14}C$-cells, respectively, in the abiotic (no culture) control and cultures containing the respiration inhibitor, sodium azide (2%). About 80% of the $^{14}CH_3O$-MTBE was incorporated into $CO_2$ and cells with the remainder (ca. 15%) as undegraded ether and/or $^{14}C$-metabolites. Addition of 100 ppm $NH_4^+$ to metabolizing cultures had no competitive effect on stimulating or inhibiting MTBE biotransformation.

TABLE 3

Distribution of $^{14}CH_3O$—MTBE in Ether-Degrading Cultures

| Condition | % of Applied $^{14}CH_3O$—MTBE[a] in | | | |
|---|---|---|---|---|
| | $CO_2$ | Cells | MTBE &/or Metabolites | % Recovery |
| 1. Control (no cells) | 0.2 | 4.1 | 13.7 | 18 |
| 2. BC-1[b] + Azide (2%) | 0.9 | 5.1 | 17.1 | 23.1 |
| 3. BC-1 | 39.0 | 42.1 | 17.8 | 98.9 |
| 4. BC-1 + $NH_4^+$ (100 ppm) | 42.3 | 40.3 | 12.5 | 95.1 |

[a]Mean of duplicate cultures did not differ by more than 10%.
[b]Suspended solids as TSS and VSS were 2440 and 1820 ppm, respectively.

CHEMICALS

Common laboratory chemicals e.g. salts, bases acids, alcohols and ketones used were purchased from Mallinckrodt or Sigma Chemical Companies. MTBE and TBA were obtained as ≧98% pure material from Chem Service Inc. of West Chester, Pa.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

What is claimed is:

1. A process for degrading TBA in a TBA-containing mixture, which process comprises growing in the presence of said TBA-containing mixture a mixed bacterial culture capable of degrading TBA and methyl t-butyl ether (MTBE), which culture is prepared by a process comprising the steps of:

adding an aqueous mixture comprising a first amount of activated sludge taken from a biotreater for treating wastewater in Chemical Plant of Shell Deer Park Manufacturing Complex located in Deer Park, Tex. container, adding a first portion of MTBE to said container to obtain a first mixture which contains from about 10 mg to about 500 mg of MTBE, incubating said first mixture at a temperature from about 10° C. to about 60° C., periodically adding additional amounts of the biosludge to said container, periodically withdrawing from the container from about 10% to about 70% of the supernatant medium followed by adding mineral solution to replace the supernatant withdrawn, and periodically adding MTBE to the container in an amount sufficient to maintain the concentration of MTBE in culture in the container at from about 10 mg to about 500 mg.

wherein at least a portion of the TBA contained in said TBA-containing mixture is degraded to carbon dioxide.

2. A process for degrading TBA in a TBA-containing mixture, which process comprises growing in the presence of said TBA mixture a mixed bacterial culture prepared by a process comprising the steps of:

adding an aqueous mixture comprising a first amount of activated sludge taken from a biotreater for treating wastewater in a chemical plant to a container, adding a first portion of an ether containing a t-butyl moiety to said container to obtain a first mixture, and incubating said first mixture at a temperature from about 10° C. to about 60° C.

3. A process for simultaneous degrading TBA and MTBE in a mixture containing both TBA and MTBE, which process comprises growing in the presence of said mixture a mixed bacterial culture prepared by a process comprising the steps of:

adding an aqueous mixture comprising a first amount of activated sludge taken from a biotreater for treating wastewater in a chemical plant to a container, adding a first portion of a MTBE to said container to obtain a first mixture, and incubating said first mixture at a temperature from about 10° C. to about 60° C.

* * * * *